(12) United States Patent
Takahashi

(10) Patent No.: US 12,525,129 B2
(45) Date of Patent: Jan. 13, 2026

(54) FOLLOWING VEHICLE APPROACH NOTIFICATION DEVICE

(71) Applicant: TOYOTA JIDOSHA KABUSHIKI KAISHA, Toyota (JP)

(72) Inventor: Masahiro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/891,554

(22) Filed: Sep. 20, 2024

(65) Prior Publication Data

US 2025/0232676 A1     Jul. 17, 2025

(30) Foreign Application Priority Data

Jan. 11, 2024   (JP) ................. 2024-002681

(51) Int. Cl.
*B60Q 1/00*     (2006.01)
*G08G 1/0967*     (2006.01)
*G08G 1/16*     (2006.01)

(52) U.S. Cl.
CPC ....... *G08G 1/166* (2013.01); *G08G 1/096791* (2013.01)

(58) Field of Classification Search
CPC .. G08G 1/166; G08G 1/096791; G08G 1/167; B60W 50/16; B60W 30/0956; B60W 30/18163; B60W 40/08; B60W 40/105; B60W 2050/143; B60W 2050/146; B60W 2540/225; B60W 2540/229; B60W 2554/4041; B60W 2554/80; B60W 30/095; B60W 50/10; B60W 2540/18; B60W 2540/20; B60W 2554/804; B60W 50/14; G06V 20/597; G08B 6/00

USPC ...... 340/436, 435, 903, 439, 425.5
See application file for complete search history.

(56) References Cited

U.S. PATENT DOCUMENTS

| | | | |
|---|---|---|---|
| 8,638,237 B2 * | 1/2014 | Robaz | G08G 1/163 340/432 |
| 9,969,261 B2 | 5/2018 | Kodama | |
| 10,045,173 B1 | 8/2018 | Morimura et al. | |
| 10,065,557 B2 * | 9/2018 | Imaishi | G08G 1/166 |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 11,618,469 B2 * | 4/2023 | Kokido | B60W 40/08 340/435 |

(Continued)

FOREIGN PATENT DOCUMENTS

JP     2018-144600 A     9/2018

*Primary Examiner* — Anh V La
(74) *Attorney, Agent, or Firm* — SoraIP, Inc.

(57) ABSTRACT

A detection device capable of detecting the approach of a following vehicle to the host vehicle and a notification device for notifying a driver of the host vehicle of the approach of a following vehicle to the host vehicle are provided. When the approach of the following vehicle to the host vehicle is detected and the direction indicator of the following vehicle is not activated, the driver of the host vehicle is notified of the approach of the following vehicle to the host vehicle, and when the direction indicator of the following vehicle is activated, the driver of the host vehicle is stopped to notify the approach of the following vehicle to the host vehicle.

6 Claims, 3 Drawing Sheets

(56) References Cited

U.S. PATENT DOCUMENTS

| | | | |
|---|---|---|---|
| 2014/0368324 A1* | 12/2014 | Seifert | B60Q 1/46 340/435 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2023/0222918 A1* | 7/2023 | Kohara | G08G 1/167 340/988 |

* cited by examiner

FOLLOWING VEHICLE APPROACH NOTIFICATION DEVICE

CROSS-REFERENCE TO RELATED APPLICATION

This application claims priority to Japanese Patent Application No. 2024-002681 filed on Jan. 11, 2024, incorporated herein by reference in its entirety.

BACKGROUND

1. Technical Field

The present disclosure relates to a following vehicle approach notification device.

2. Description of Related Art

An alert device adapted to stop issuing an alert for a following vehicle when there is a concern that the following vehicle may collide against a host vehicle and the following vehicle is determined to be performing an operation of overtaking the host vehicle in a vehicle adapted to issue an alert for the following vehicle when the following vehicle approaches the host vehicle and there is a concern that the following vehicle may collide against the host vehicle is known (see Japanese Unexamined Patent Application Publication No. 2018-144600 (JP 2018-144600 A), for example).

SUMMARY

On the other hand, in a case where the following vehicle approaches the host vehicle from behind, there is a likelihood of tailgating while there is not a concern of immediate collision, and it is thus possible to state that attention of a driver of the host vehicle is preferably called for in regard to the approach of the following vehicle to the host vehicle in this case. It is possible to state that even in this case, if the following vehicle changes a lane when the following vehicle approaches the host vehicle, the calling for attention for the following vehicle is preferably stopped. However, it is still difficult to accurately determine whether or not the following vehicle has changed the lane in practice, and there is a problem that the attention of the driver of the host vehicle is called for even when the following vehicle has changed the lane.

In order to solve such a problem, an aspect of the present disclosure is a following vehicle approach notification device. The following vehicle approach notification device includes: a detection device that is able to detect approach of a following vehicle traveling behind a host vehicle and following the host vehicle; a notification device that notifies a driver of the host vehicle of approach of the following vehicle to the host vehicle; and a processor.
The processor
  acquires operation information of a direction indicator of the following vehicle when the detection device detects the approach of the following vehicle traveling behind the host vehicle and following the host vehicle,
  causes the notification device to notify the driver of the host vehicle of the approach of the following vehicle to the host vehicle when the direction indicator of the following vehicle is not operating, and
  stops causing the notification device to notify the driver of the host vehicle of the approach of the following vehicle to the host vehicle when the direction indicator of the following vehicle is operating.

It is possible to reduce an unnecessary notification issued for a driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First, the term used in the present disclosure will be described, in the present disclosure, a vehicle that is a control target according to the present disclosure is referred to as an "host vehicle", and a vehicle that is traveling following the host vehicle behind the host vehicle is referred to as a "following vehicle".

Figure 1:
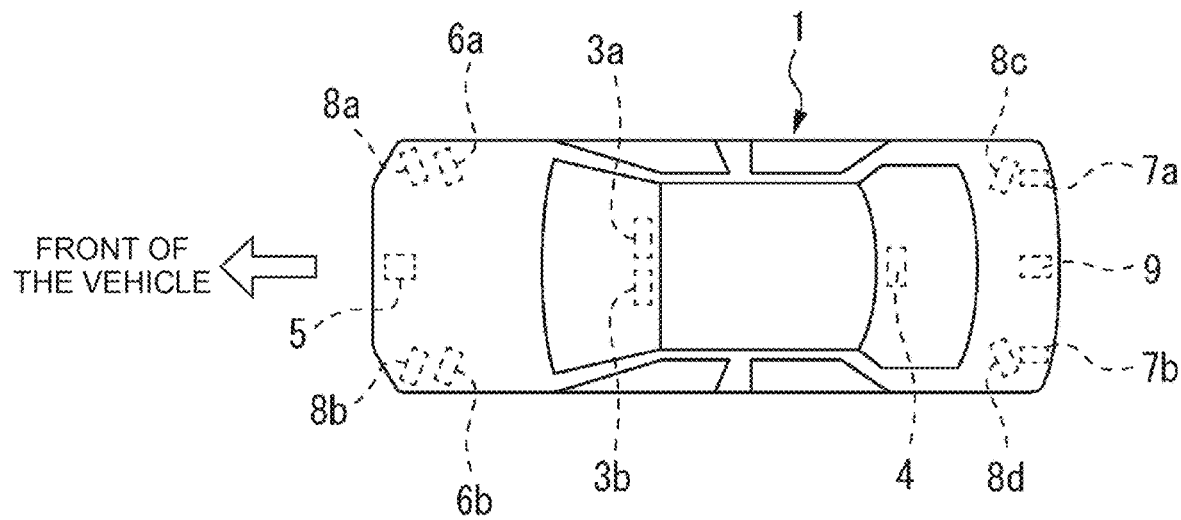
FIG. 1 is a top view of the vehicle shown schematically.
Figure 2:
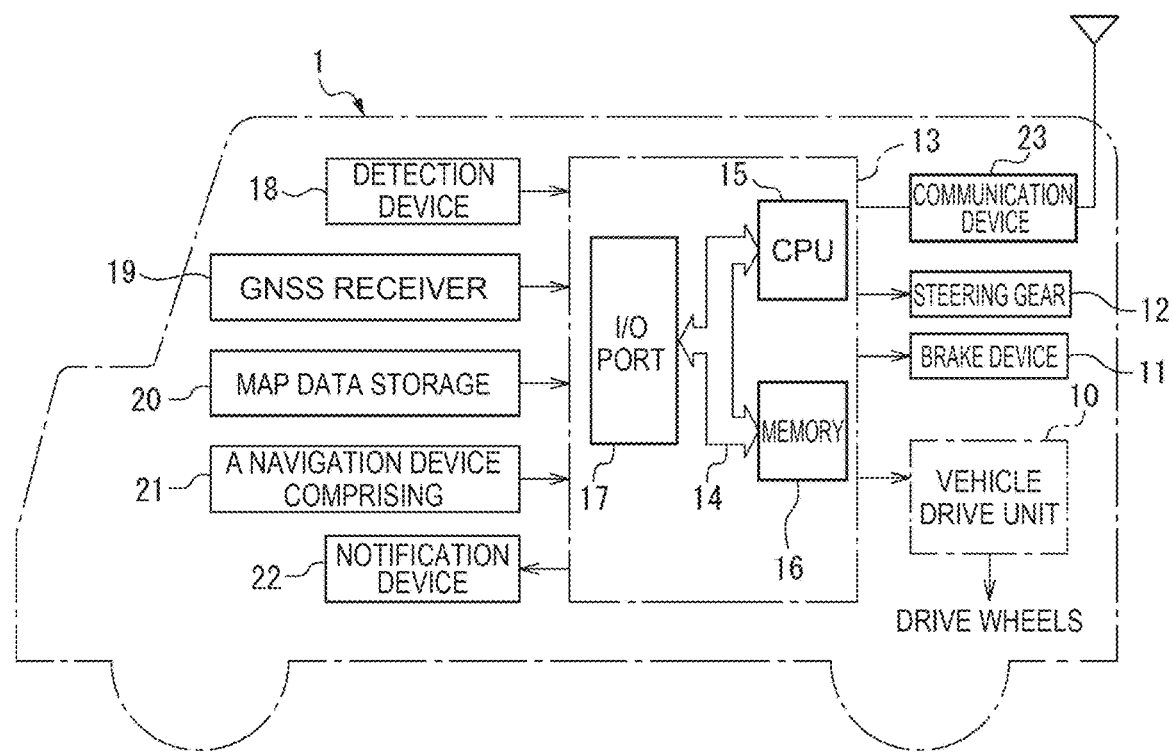
FIG. 2 is a diagram illustrating a functional configuration of the host vehicle.

FIG. 1 schematically shows a host vehicle 1 when viewed from above, and FIG. 2 shows a functional configuration of the host vehicle 1 shown in FIG. 1. The host vehicle 1 can perform any of manual driving and automatic driving. Referring to FIG. 2, reference numeral 10 denotes a vehicle driving unit for applying a driving force to driving wheels of the vehicle 1, 11 denotes a braking device for braking the vehicle 1, 12 denotes a steering device for steering the vehicle 1, and 13 denotes an electronic control unit mounted in the vehicle 1. As shown in FIG. 2, the electronic control unit 13 comprises a digital computer and comprises a CPU (processor) 15, a memory 16 including a ROM and a RAM, and an input/output 17 connected to each other by a bi-directional buss 14.

On the other hand, as shown in FIG. 2, a detection device 18 including various sensors necessary for the host vehicle 1 to perform automatic driving is installed in the host vehicle 1. The detection device 18 includes a sensor for detecting the state of the host vehicle 1 and a sensor for detecting the periphery of the host vehicle 1. In this case, an acceleration sensor, a speed sensor, an azimuth angle sensor, and a geomagnetic sensor are used as sensors for detecting the state of the host vehicle 1. As sensors for detecting the surroundings of the host vehicle 1, cameras for photographing the front, side, and rear of the host vehicle 1, a LIDAR for detecting the front, side, and rear of the host vehicle 1, a radar, a clearance sonar, and the like are used.

FIG. 1 shows an example of a sensor installed in the host vehicle 1. In the embodiment shown in FIG. 1, the host vehicle 1 is provided with a front camera 3a, 3b for photographing the front of the host vehicle 1, a rear camera 4 for photographing the rear of the host vehicle 1, a long-distance millimeter wave radar 5 for radiating millimeter waves toward the front of the host vehicle 1, a medium-distance millimeter wave radar 6a, 6b for radiating millimeter waves toward the side of the host vehicle 1, a long-range millimeter-wave radar 7a, 7b for radiating millimeter waves toward the rear of the host vehicle 1, a rider 8a, 8b, 8c, 8d for irradiating a laser beam toward the side of the host vehicle 1, and a clearance sonar 9 for emitting ultrasonic waves toward the rear of the host vehicle 1. Note that the method of installing the camera and the sensor shown in FIG. 1 is merely an example, and there are various methods of installing the camera and the sensor.

Returning to FIG. 2, the host vehicle 1 is provided with a GNSS (Global Navigation Satellite System) receiver 19, a map-data storage device 20, a navigational device 21, and a notification device 22 for notifying the driver of the surrounding conditions. GNSS receiving device 19 can detect the present position of the host vehicle 1 (for example, the latitude and longitude of the host vehicle 1) based on information obtained from a plurality of satellites. Therefore, the present position of the host vehicle 1 can be acquired by GNSS receiving device 19. As GNSS receiving device 19, for example, a GPS receiving device is used. In addition, the map data storage device 20 stores map data and the like necessary for traveling of the host vehicle 1. The map data also includes information about the road. The various sensors 18, GNSS receiving device 19, the map-data storage device 20, the navigational device 21, and the notification device 22 are connected to the electronic control unit 13. The vehicle 1 is also equipped with a communication device 23 connected to the electronic control unit 13.

In the example illustrated in FIG. 2, the host vehicle 1 can perform manual driving, and when the host vehicle 1 is requested to perform travel control by automatic driving, the host vehicle 1 can perform travel control by automatic driving. In the example illustrated in FIG. 2, the vehicle drive unit 10 of the host vehicle 1 is configured by an electric motor driven by a secondary battery or an electric motor driven by a fuel cell. The drive wheels are driven and controlled by these electric motors in accordance with the output signals of the electronic control unit 13. In the example shown in FIG. 2, when the vehicle 1 is requested to perform travel control by automatic driving, braking control of the vehicle 1 is performed by the braking device 11 in accordance with an output signal from the electronic control unit 13. The steering control of the vehicle 1 is also performed by the steering device 12 in accordance with an output signal of the electronic control unit 13.

Figure 3:
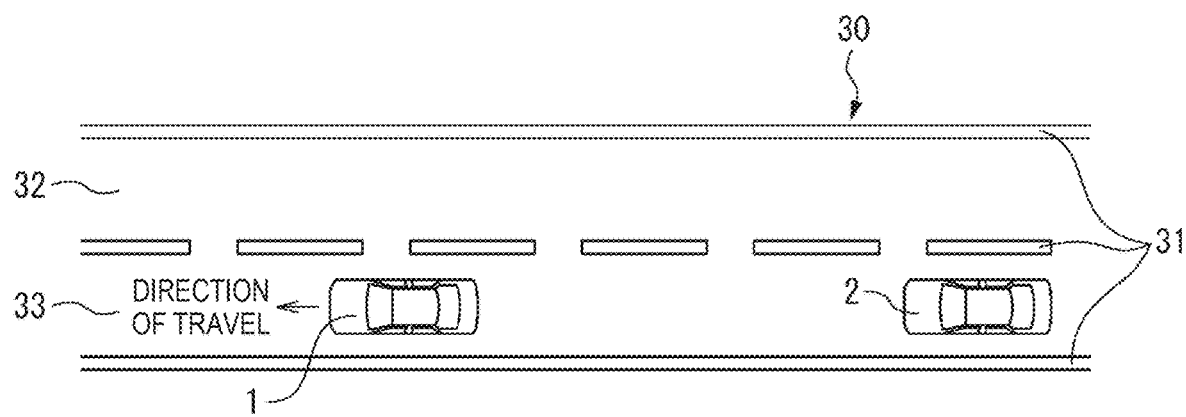
FIG. 3 is a top view of a road.

FIG. 3 shows the road 30 as viewed from above. In FIG. 3, reference numeral 31 denotes a white line, reference numeral 32 denotes an overtaking lane, reference numeral 33 denotes a traveling lane, and FIG. 3 shows a host vehicle 1 traveling in the traveling lane 33 and a following vehicle 2 traveling in the traveling lane 33 following the host vehicle 1. FIG. 3 shows a case where the following vehicle 2 approaches the host vehicle 1 while the host vehicle 1 is traveling on the traveling lane 33. In this case, there is no possibility that the following vehicle 2 immediately collides with the host vehicle 1, but there is a possibility that the following vehicle 2 performs the fueling operation. In this case, it can be said that it is preferable that the driver of the host vehicle 1 gives a warning that the following vehicle 2 has approached the host vehicle 1 from the rear.

Therefore, in the embodiment according to the present disclosure, when the following vehicle 2 approaches the host vehicle 1 from a position far away to a position shown in FIG. 3, the driver of the host vehicle 1 is alerted that the following vehicle 2 has approached the host vehicle 1. In this case, the alert is made by the notification device 22 by a wording display or a voice. In a case where the notification of the approach of the rear vehicle 2 is performed by the wording display, for example, "the following vehicle is approaching" is displayed on the display screen of the meter installed on the dashboard in the vehicle cabin. In this instance, the head-up display (Head-up Display) technique can also be used to display words on the windshield, such as "the following vehicles are approaching." In addition, when the notification of the approach of the following vehicle 2 is performed by voice, for example, a voice such as "the following vehicle is approaching" is generated from a speaker installed on the dashboard in the vehicle cabin. As described above, in the embodiment according to the present disclosure, the notification of the approach of the following vehicle 2 to the host vehicle 1 is performed by at least one of the wording display and the voice.

On the other hand, when the following vehicle 2 changes the lane from the traveling lane 33 to the overtaking lane 32, there is no need to draw attention, and when the warning is given at this time, it can be said that the driver of the host vehicle 1 is very troublesome. Therefore, when the following vehicle 2 changes the lane, it is desirable to stop the alert from being given. However, when the following vehicle 2 changes lane, the following vehicle 2 often changes lane after approaching the host vehicle 1 more closely than the position shown in FIG. 3. However, when the following vehicle 2 is closer to the host vehicle 1 than the position shown in FIG. 3 in this way, an alert is given. Therefore, in practice, it is quite difficult to stop the alert from being made when the following vehicle 2 changes lane.

Figure 4:
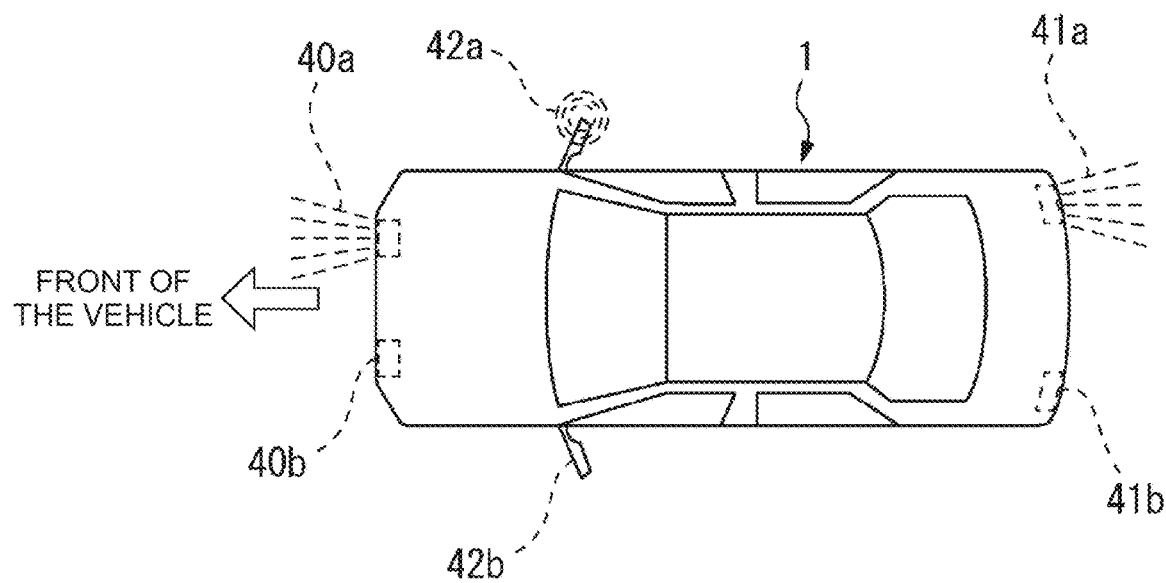
FIG. 4 is a top view of the vehicle shown diagrammatically.

On the other hand, when the lane is changed, the direction indicator is normally activated. FIG. 4 illustrates an example of a direction indicator in the host vehicle 1. In the embodiment illustrated in FIG. 4, the direction indicator includes a pair of front turn lamp 40*a*, 40*b* disposed on the front surface of the host vehicle 1, a pair of rear turn lamp 41*a*, 41*b* disposed on the rear surface of the host vehicle 1, and a pair of door mirror turn lamp 42*a*, 42*b* disposed on the door mirror of the host vehicle 1. Note that FIG. 4 shows that the front turn lamp 40*a*, the rear turn lamp 41*a*, and the door mirror turn lamp 42*a* are periodically lit.

When a lane is changed, the direction indicator is usually operated from a point before the lane is changed. On the other hand, it is possible to easily determine whether or not the direction indicator is activated. For example, it is possible to detect whether or not the direction indicator of the following vehicle 2 is turned on by the rear camera 4, and therefore, it is possible to determine whether or not the direction indicator of the following vehicle 2 is activated based on the captured image data by the rear camera 4. Further, in the embodiment according to the present disclosure, inter-vehicle communication with the following vehicle 2 can be performed by the communication device 23. Therefore, it is also possible to acquire the operation information of the direction indicator of the following vehicle 2 by the inter-vehicle communication, and determine whether or not the direction indicator of the following vehicle 2 is activated based on the acquired operation information. Therefore, in the embodiment according to the present disclosure, when the following vehicle 2 approaches the host vehicle 1, it is determined whether or not the direction indicator of the following vehicle 2 is activated. When the direction indicator of the following vehicle 2 is activated, the warning is stopped.

In order to achieve the present disclosure, in the embodiment according to the present disclosure, as shown in FIG. 2, a detection device 18 capable of detecting the approach of the following vehicle 2 to the host vehicle 1 and a notification device 22 for notifying the driver of the host vehicle 1 of the approach of the following vehicle 2 to the host vehicle 1 are provided. Here, the detection device 18 detects the approach of the following vehicle 2 to the host vehicle 1 using, for example, the detection power of the long-range millimeter-wave radar 7a, 7b. Here, for example, the presence of the following vehicles 2 is ascertained on the basis of the detected power of the long-range millimeter-wave radar 7a, 7b. A distance D between the host vehicle 1 and the following vehicle 2 and a relative velocity ΔV between the host vehicle 1 and the following vehicle 2 are calculated based on the detected power of the long-range millimeter-wave radar 7a, 7b.

On the other hand, in the embodiment according to the present disclosure, the time TTC until the following vehicle 2 collides with the host vehicle 1 is calculated by dividing the distance D between the host vehicle 1 and the following vehicle 2 by the relative speed ΔV. The calculated time TTC until the collision is used as a trigger when the following-vehicle approach notification is started. The threshold X of the time TTC until the collision is set to, for example, 9 seconds, and when the time TTC until the collision becomes equal to or less than the threshold X, for example, 9 seconds or less, the following vehicle approach notification, that is, the notification of the approach of the following vehicle 2 is started. When the turn signal is activated prior to the time TTC until the collision becoming equal to or less than the threshold X, the following vehicle approach notification, that is, the notification of the approach of the following vehicle 2 is stopped. In addition, in this case, when the direction indicator is activated before the inter-vehicle distance D becomes equal to or smaller than the preset distance, it is also possible to stop the notification of the approach of the following vehicle, that is, the notification of the approach of the following vehicle 2.

Figure 5:
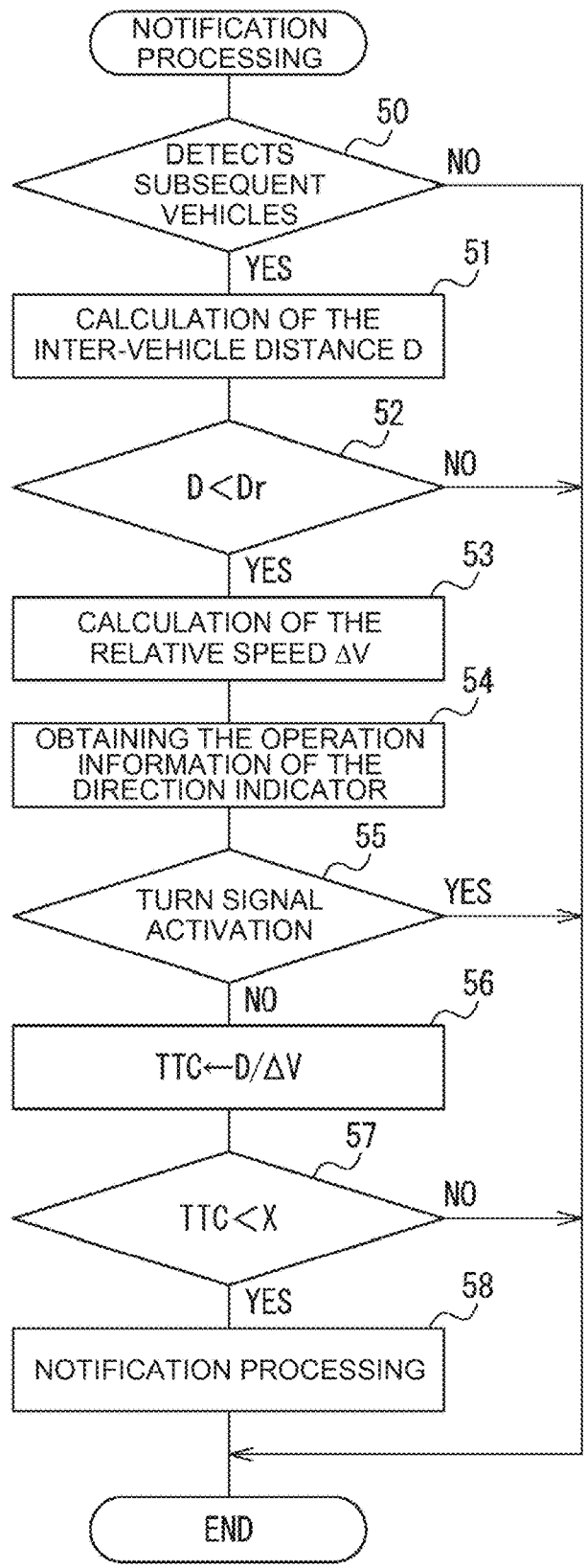
FIG. 5 is a flowchart for executing a notification process.

FIG. 5 shows a routine for executing a following vehicle approach notification process for notifying the driver of the host vehicle 1 that the following vehicle 2 has approached the host vehicle 1. This routine is repeatedly executed in the electronic control unit 13 of the host vehicle 1.

Referring to FIG. 5, first, in step 50, it is determined whether or not the following vehicle 2 traveling following the host vehicle 1 is detected behind the host vehicle 1 based on the detected power of the long-range millimeter-wave radar 7a, 7b. When the following vehicle 2 is not detected, the processing cycle ends. On the other hand, when the following vehicle 2 is detected, the process proceeds to step 51, and the distance D between the host vehicle 1 and the following vehicle 2 is calculated based on the detected power of the long-range millimeter-wave radar 7a, 7b. Next, in step 52, it is determined whether or not the distance D between the host vehicle 1 and the following vehicle 2 is shorter than a preset limit distance Dr, and when it is determined that the distance D exceeds the limit distance Dr, the process cycle is ended. The limit distance Dr indicates the longest distance that can accurately calculate the distance D between the host vehicle 1 and the following vehicle 2 by accurately recognizing the presence of the following vehicle 2 traveling following the host vehicle 1 behind the host vehicle 1 by the long-range millimeter-wave radar 7a, 7b. In an embodiment according to the disclosure, this limit distance Dr is 80 m.

On the other hand, when it is determined in step 52 that the distance D between the host vehicle 1 and the following vehicle 2 is shorter than the limit distance Dr, the process proceeds to step 53, and the relative velocity ΔV between the host vehicle 1 and the following vehicle 2 is calculated based on the temporal change in the distance D between the host vehicle 1 and the following vehicle 2. Then, in step 54, the activation information of the direction indicator of the following vehicle 2 is obtained. In this case, in an embodiment according to the present disclosure, the operation information of the direction indicator of the following vehicle 2 is obtained from the captured image data by the rear camera 4. Further, in another embodiment according to the present disclosure, the operation information of the direction indicator of the following vehicle 2 is acquired by inter-vehicle communication between the host vehicle 1 and the following vehicle 2.

Next, in step 55, it is determined whether or not the direction indicator of the following vehicle 2 is activated based on the operation information of the direction indicator of the following vehicle 2 acquired in step 54. When it is determined that the direction indicator of the following vehicle 2 is activated, the processing cycle is ended. On the other hand, when it is determined that the direction indicator of the following vehicle 2 is not activated, the process proceeds to step 56, and the time TTC until the following vehicle 2 collides with the host vehicle 1 is calculated by dividing the distance D between the host vehicle 1 and the following vehicle 2 by the relative speed ΔV. Next, in step 57, it is determined whether or not the time TTC until the collision is equal to or less than the threshold X. When it is determined that the time TTC until the collision is longer than the thresholds X, for example, 9 seconds, the process is ended.

On the other hand, when it is determined in step 57 that the time TTC until the collision is equal to or less than the threshold X, the process proceeds to step 58, where a following vehicle approach notification, that is, a process of starting a notification of the approach of the following vehicle 2 is performed. The notification of the approach of the following vehicle 2 to the host vehicle 1 is continuously performed while the time TTC until the collision is equal to or less than the threshold X. As described above, in the embodiment according to the present disclosure, when the direction indicator of the following vehicle 2 is activated before the time TTC until the collision becomes equal to or less than the threshold X, the following vehicle approach notification, that is, the notification of the approach of the following vehicle 2 is stopped. As can be seen from the flow chart shown in FIG. 5, when the direction indicator of the following vehicle 2 is activated even after the time TTC until the collision becomes equal to or less than the threshold X, the following vehicle approach notification, that is, the notification of the approach of the following vehicle 2 is immediately stopped.

As described above, the following vehicle approach notification device according to the present disclosure includes the detection device 18 capable of detecting the approach of the following vehicle 2 traveling following the host vehicle 1 behind the host vehicle 1, the notification device 22 notifying the driver of the host vehicle 1 of the approach of the following vehicle 2 to the host vehicle 1, and the processor 15. In the present disclosure, the processor 15 acquires the operation information of the direction indicator of the following vehicle 2 when the approaching of the following vehicle 2 traveling following the host vehicle 1 behind the host vehicle 1 is detected by the detection device 18. At this time, when the direction indicator of the following vehicle 2 is not activated, the driver of the host vehicle 1 is notified of the approach of the following vehicle 2 to the host vehicle 1 by the notification device 22. When the direction indicator of the following vehicle 2 is activated, the notification device 22 stops causing the driver of the host vehicle 1 to notify the approach of the following vehicle 2 to the host vehicle 1.

In this case, in an embodiment according to the present disclosure, the detection device 18 is capable of detecting the lighting of the direction indicator of the following vehicle 2, and when the detection device 18 detects the lighting of the direction indicator of the following vehicle 2, it is determined that the direction indicator of the following vehicle 2 is activated. Further, in another embodiment according to the present disclosure, a communication device 23 for performing inter-vehicle communication between the host vehicle 1 and the following vehicle 2 is provided, and the operation information of the direction indicator of the following vehicle 2 is acquired by the inter-vehicle communication.

Further, in the embodiment according to the present disclosure, when the approach of the following vehicle 2 traveling following the host vehicle 1 behind the host vehicle 1 is detected by the detection device 18, the inter-vehicle distance D between the host vehicle 1 and the following vehicle 2 is calculated based on the detection result of the detection device 18. When the inter-vehicle distance D becomes equal to or smaller than the preset distance Dr, the operation data of the direction indicator of the following vehicle 2 is acquired.

Further, in the embodiment according to the present disclosure, the time TTC until the following vehicle 2 collides with the host vehicle 1 is calculated based on the detection result of the detection device 18. When the direction indicator of the following vehicle 2 is not activated, the notification device 22 notifies the driver of the host vehicle 1 of the approach of the following vehicle 2 to the host vehicle 1 when the calculated time TTC until the collision becomes equal to or less than the preset time X. When the direction indicator of the following vehicle 2 is activated, the notification device 22 stops causing the driver of the host vehicle 1 to notify the approach of the following vehicle 2 to the host vehicle 1.

What is claimed is:

1. A following vehicle approach notification device comprising:
    a detection device that is able to detect approach of a following vehicle traveling behind a host vehicle and following the host vehicle;
    a notification device that notifies a driver of the host vehicle of approach of the following vehicle to the host vehicle;
    a processor, wherein the processor
        acquires operation information of a direction indicator of the following vehicle when the detection device detects the approach of the following vehicle traveling behind the host vehicle and following the host vehicle,
        causes the notification device to notify the driver of the host vehicle of the approach of the following vehicle to the host vehicle when the direction indicator of the following vehicle is not operating, and
        stops causing the notification device to notify the driver of the host vehicle of the approach of the following vehicle to the host vehicle when the direction indicator of the following vehicle is operating.

2. The following vehicle approach notification device according to claim 1, wherein the detection device is able to detect lighting of the direction indicator of the following vehicle, and the processor determines that the direction indicator of the following vehicle is operating when the detection device detects the lighting of the direction indicator of the following vehicle.

3. The following vehicle approach notification device according to claim 1, comprising a communication device that performs inter-vehicle communication between the host vehicle and the following vehicle, wherein the processor acquires the operation information of the direction indicator of the following vehicle through the inter-vehicle communication.

4. The following vehicle approach notification device according to claim 1, wherein the processor calculates an inter-vehicle distance between the host vehicle and the following vehicle based on a detection result of the detection device when the detection device detects the approach of the following vehicle traveling behind the host vehicle and following the host vehicle, and acquires the operation information of the direction indicator of the following vehicle when the inter-vehicle distance becomes equal to or less than a preset distance.

5. The following vehicle approach notification device according to claim 1, wherein the processor calculates a time until the following vehicle collides with the host vehicle based on the detection result of the detection device, and causes the notification device to notify the driver of the host vehicle of the approach of the following vehicle to the host vehicle when the calculated time until the collision becomes equal to or less than a preset time in a case where the direction indicator of the following vehicle is not operating, or stops causing the notification device to notify the driver of the host vehicle of the approach of the following vehicle to the host vehicle when the direction indicator of the following vehicle is operating.

6. The following vehicle approach notification device according to claim 1, wherein the notification of the approach of the following vehicle to the host vehicle is performed using at least one of text display and voice.

\* \* \* \* \*